United States Patent
Bonagiri et al.

(10) Patent No.: US 9,679,033 B2
(45) Date of Patent: Jun. 13, 2017

(54) RUN TIME INSERTION AND REMOVAL OF BUFFER OPERATORS

(71) Applicant: International Business Machines Corporation, Armonk, NY (US)

(72) Inventors: Krishna K. Bonagiri, Hyderabad (IN); Kalyanji Chintakayala, Hyderabad (IN); Ritesh K. Gupta, Hyderabad, IN (US)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 14/221,834

(22) Filed: Mar. 21, 2014

(65) Prior Publication Data

US 2015/0269235 A1    Sep. 24, 2015

(51) Int. Cl.
  *G06F 7/00*    (2006.01)
  *G06F 17/00*   (2006.01)
  *G06F 17/30*   (2006.01)

(52) U.S. Cl.
  CPC ............... *G06F 17/30563* (2013.01)

(58) Field of Classification Search
  CPC .............................................. G06F 17/30563
  USPC .......................................................... 707/602
  See application file for complete search history.

(56) References Cited

U.S. PATENT DOCUMENTS

| | | | |
|---|---|---|---|
| 6,208,990 B1 | 3/2001 | Suresh et al. | |
| 6,310,909 B1 * | 10/2001 | Jones | H04L 5/0046 375/220 |
| 6,697,902 B1 * | 2/2004 | Sugimoto | G11B 20/10527 348/E5.007 |
| 6,934,735 B1 * | 8/2005 | Emens | H04L 67/325 709/203 |
| 7,103,590 B1 | 9/2006 | Murthy et al. | |
| 7,234,008 B1 * | 6/2007 | Russ | G06F 13/124 710/52 |
| 8,214,324 B2 | 7/2012 | Joerg et al. | |
| 8,307,109 B2 | 11/2012 | Mamou et al. | |
| 2006/0155727 A1 * | 7/2006 | Kim | G06F 21/10 |
| 2007/0036177 A1 * | 2/2007 | Isnardi | H04M 11/062 370/490 |

(Continued)

OTHER PUBLICATIONS

PR3 System, Data Set Buffering, 2010.*

(Continued)

*Primary Examiner* — Binh V Ho
(74) *Attorney, Agent, or Firm* — Reza Sarbakhsh (57) ABSTRACT

Insertion, in a data warehouse process, of a buffer operator between an upstream data operator and a downstream data operator. The processor processes a data record for the upstream data operator to pass to the downstream data operator. In response to determining that the downstream data operator is not ready to accept the data record from the upstream data operator, a buffer operator is inserted between the upstream data operator and the downstream data operator. The data record processed by the upstream data operator is passed to the buffer operator for storing into a buffer allocated for use by the buffer operator. The data record stored into the buffer is passed to the downstream data operator when the downstream data operator is ready to accept data. In another aspect, when the allocated buffer utilization decreases to a threshold value, the buffer operator is removed and the buffers are released.

14 Claims, 8 Drawing Sheets

(56) References Cited

U.S. PATENT DOCUMENTS

| | | | | |
|---|---|---|---|---|
| 2009/0116412 | A1* | 5/2009 | Yanagihara | H04L 12/185 370/256 |
| 2010/0106922 | A1* | 4/2010 | Thyagarajan | H04L 1/0001 711/157 |
| 2010/0183298 | A1* | 7/2010 | Biegert | H04Q 11/0067 398/17 |
| 2011/0255676 | A1* | 10/2011 | Marchand | G06Q 30/0225 379/114.14 |
| 2011/0281570 | A1* | 11/2011 | Shi | H04W 24/10 455/418 |
| 2012/0030723 | A1* | 2/2012 | Baum | H04N 21/23432 725/105 |
| 2012/0137164 | A1* | 5/2012 | Uhlig | G06F 11/004 714/4.11 |
| 2012/0191406 | A1* | 7/2012 | Okumura | G01P 21/02 702/146 |
| 2012/0230219 | A1* | 9/2012 | Pettersson | H04W 36/24 370/252 |
| 2012/0271865 | A1 | 10/2012 | Jin et al. | |
| 2013/0007750 | A1 | 1/2013 | Beckerle et al. | |
| 2014/0006464 | A1* | 1/2014 | Pitts | G06F 15/167 707/827 |
| 2015/0193368 | A1* | 7/2015 | Caufield | G06F 13/36 710/310 |
| 2015/0257035 | A1* | 9/2015 | Grinshpun | H04L 65/4092 370/235 |

OTHER PUBLICATIONS

Simitsis et al., "Partitioning Real-Time ETL Workflows", Published in NTII 2010.

Vassiliadis et al., "Near real Time ETL", Published in AoIS vol. 3, 2008, Special issue on New Trends in Data Warehousing and Data Analysis, pp. 1-38.

IBM, "IBM WebSphere DataStage and QualityStage Parallel Job Advanced Developer Guide", Version 8 Release 1, Copyright IBM Corp. 2006, 2008, pp. 1 and 27-30.

\* cited by examiner

RUN TIME INSERTION AND REMOVAL OF BUFFER OPERATORS

BACKGROUND

The present disclosure relates generally to information management, and more particularly, to improving throughput and avoiding deadlocks in data warehouse information management.

Data warehouse information management extracts data from a variety of data sources with different formats and purposes, such as purchasing, sales, and payroll, and integrates them into a data warehouse used for data analysis and reporting. The extracted data may be transformed, for example, sorted and filtered, before being loaded into the data warehouse for reporting and analysis. A set of data staging processes, or operators, in data warehouse information management are typically used to integrate the disparate data sources into the data warehouse. Extract, Transform, and Load (ETL) refers to a set of data staging operators that bring all the data together into one standard, homogeneous environment. The extract stage obtains the disparate data. The transform stage applies a series of rules or functions to the data, such as selecting specific data, sorting the data, and joining data from multiple sources. The load stage imports the transformed data into the data warehouse.

SUMMARY

Embodiments of the present disclosure disclose a method, computer program product, and system for insertion, in a data warehouse process, of a buffer operator between an upstream data operator and a downstream data operator. The processor processes a data record for the upstream data operator to pass to the downstream data operator. In response to determining that the downstream data operator is not ready to accept the data record from the upstream data operator, the processor inserts a buffer operator between the upstream data operator and the downstream data operator. The processor passes the data record processed by the upstream data operator to the buffer operator for storing into a buffer allocated for use by the buffer operator. The processor passes the data record stored into the buffer to the downstream data operator when the downstream data operator is ready to accept data.

In another aspect, in response to the processor determining that a buffer utilization of the buffer allocated to the buffer operator decreases to a threshold value, the processor drains the buffer, removes the buffer operator, releases the buffer, and passes data records processed by the upstream data operator directly to the downstream data operator.

BRIEF DESCRIPTION OF THE SEVERAL VIEWS OF THE DRAWINGS

Features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Data warehouse information management is expected to operate efficiently and with a minimal number of system resources. ETL operators may run as a real-time process or as a batch job, and typically, ETL processes or jobs must complete within a contracted delivery time. Delays in completing any ETL operator may add to the cost of processing, may cause a rework and reallocation of resources due to a preemption of a partially executed ETL process, may cause a backlog of resources needed for a next process, may backlog batch processing by re-executing batch ETL processes on subsequent days, causing them to run along with the subsequent day's batch processes, and may cause contracted delivery times to be missed. ETL processing delays may be caused by a slow ETL operator. Operators such as those that search for data, or join data from multiple sources, may not allow their data to flow to later operators until the search or join completes. This may cause a delay when large volumes of data are being processed. Operators may also experience delays due to network or I/O speeds. ETL operators may also experience deadlocks when multiple operators require data from each other to progress. A deadlock may occur when an ETL operator forks, or creates two data paths that are later joined, or combined, in a downstream operator and each data path requires data from the other.

ETL operators operate upon, or process, the data, such as extracting data, sorting the data, and filtering the data, and send the data downstream to the next ETL operator. In typical ETL processing, operators receive data from an upstream operator, process the data, pass it on to a downstream operator, and request additional data from the upstream operator. Data transfer and requests for additional data take place on data communication links connecting the ETL operators. Data communication links may include, but are not limited to, dedicated processor memory, registers, and temporary storage.

Upstream operators wait for the downstream operator to signal they are ready to accept additional data before sending additional data. A delayed downstream operator will prevent an upstream operator from sending any additional data downstream, causing the upstream operator to delay processing subsequent data. Adding buffering, or buffer operators, for a delayed operator may allow the upstream operator to continue passing data, to the buffer operator to be buffered, instead of waiting for the delayed downstream operator to signal it is ready to accept additional data. The downstream operator may receive data from the buffer operator, as needed, to continue processing. Buffering allows the upstream operator to continue processing, minimizes delays, and prevents deadlocks.

Typically buffering is added at the time an ETL process is designed. Operators that are predicted to be slow, and operators recognized as having the potential to create a deadlock, may have buffer operators added, just before them, in the ETL process. Adding buffer operators may alleviate the backlog of data due to a slow operator in the ETL process, but may allocate system resources for buffers and may add processing time. Predicting, at design time, which operators may be slow may not always be accurate nor easily determined. An operator may be slow depending on run time conditions, or depending on the amount of data being handled. An exemplary ETL process, running in the cloud, may handle 100 Gigabytes of data in one run of the ETL process, and handle four Terabytes of data the next run. Buffer operators added to the ETL process at design time, to handle the four Terabytes of data, consume system resources for buffers that may be unnecessary when handling the 100 Gigabytes of data.

Discovering, during execution, that an ETL process has experienced a deadlock, or has failed to meet its contracted delivery time may cause buffering to be added as a fix for the ETL process. Adding buffering as a fix for an ETL process may require a process redesign.

ETL tools such as IBM® InfoSphere™ DataStage®, and Ab Initio provide mechanisms to automatically insert buffering, into an ETL process at the start of ETL process execution. IBM InfoSphere DataStage inserts buffering, as buffer operators, and determines where the buffer operators are to be inserted. For example, the ETL tool may insert buffering for all operators, or only insert buffering for operators that it recognizes as potential deadlock producing operators, such as fork and join operators.

ETL tools typically insert buffering on links between upstream operators and downstream operators. The buffer operator, as may be found, for example, in IBM InfoSphere DataStage operator libraries, attempts to match the rates of its input and output. When no data is being read from the buffer operator by the downstream operator, the buffer operator tries to throttle back incoming data from the upstream operator to avoid having the buffer grow so large that it must be written out to disk. ETL tools typically allow users to control the maximum buffer size allocated by the buffer operators.

ETL design time placement of buffer operators and ETL tool placement of buffering is static. Each time the ETL process is executed, buffering will occur before the same operator. ETL tool-inserted buffer operators will be inserted before the same operators, and will consume system resources for buffers, even when there are no delays or deadlocks that require buffering.

Operators experiencing delays can vary each time an ETL process executes, and the most advantageous buffering locations may not be predictable by either ETL tools nor during ETL design. It would be advantageous to insert buffer operators as needed during run time. Inserting buffer operators during run time, as needed, enhances performance when operators experience delays or deadlocks that may not have been anticipated at ETL design time or by the ETL tools. Inserting buffer operators during run time, as needed, only consumes system resources for buffers when buffers are needed. This disclosure also advantageously removes buffer operators during run time when buffers are no longer needed, thereby releasing valuable system resources.

Exemplary embodiments of the disclosure are described using ETL processes for data warehousing, although those of skill in the art will appreciate that other embodiments of the invention may be used to advantage for numerous processes where a slow downstream process that is consuming data delays an upstream producer of the data.

Figure 1:
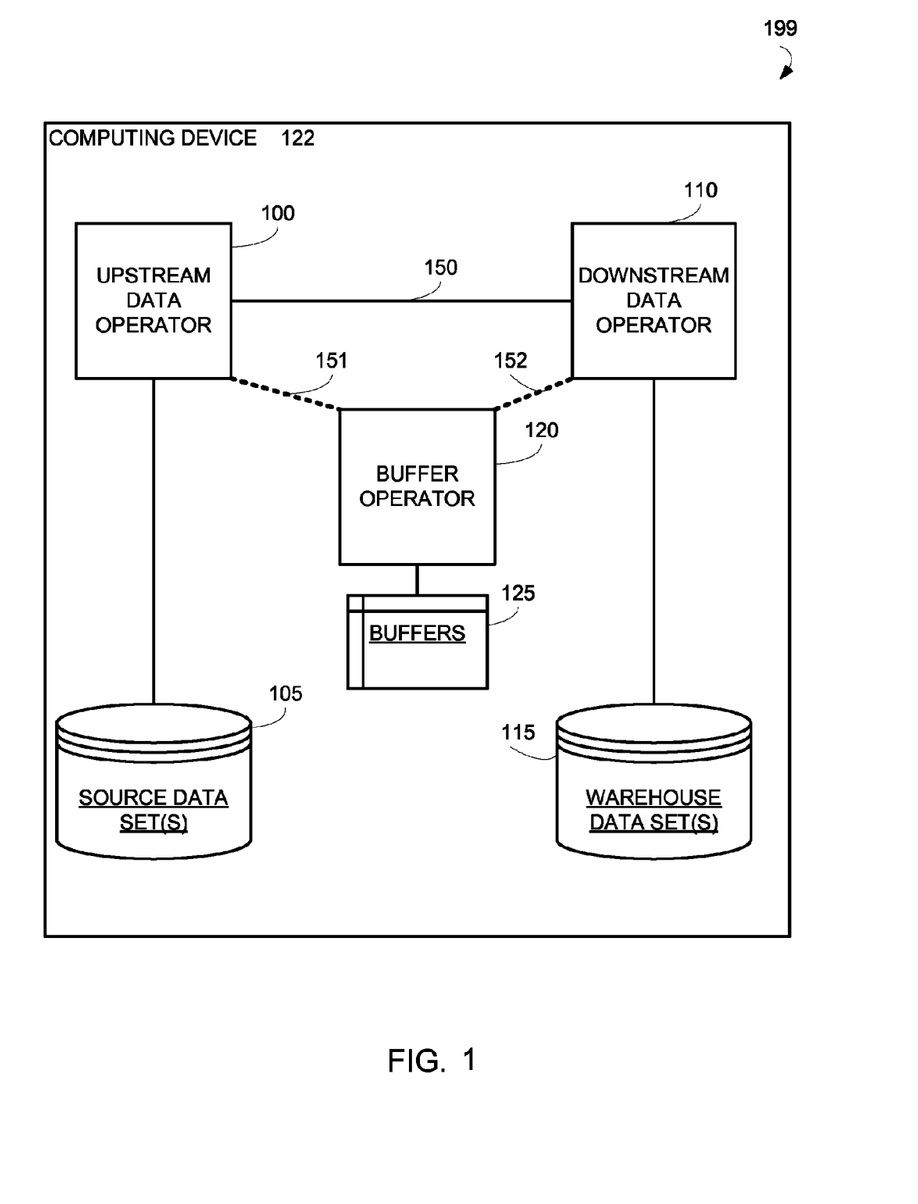
FIG. 1 illustrates a functional block diagram of a data warehouse information system, in accordance with an embodiment of the disclosure.
Figure 8:
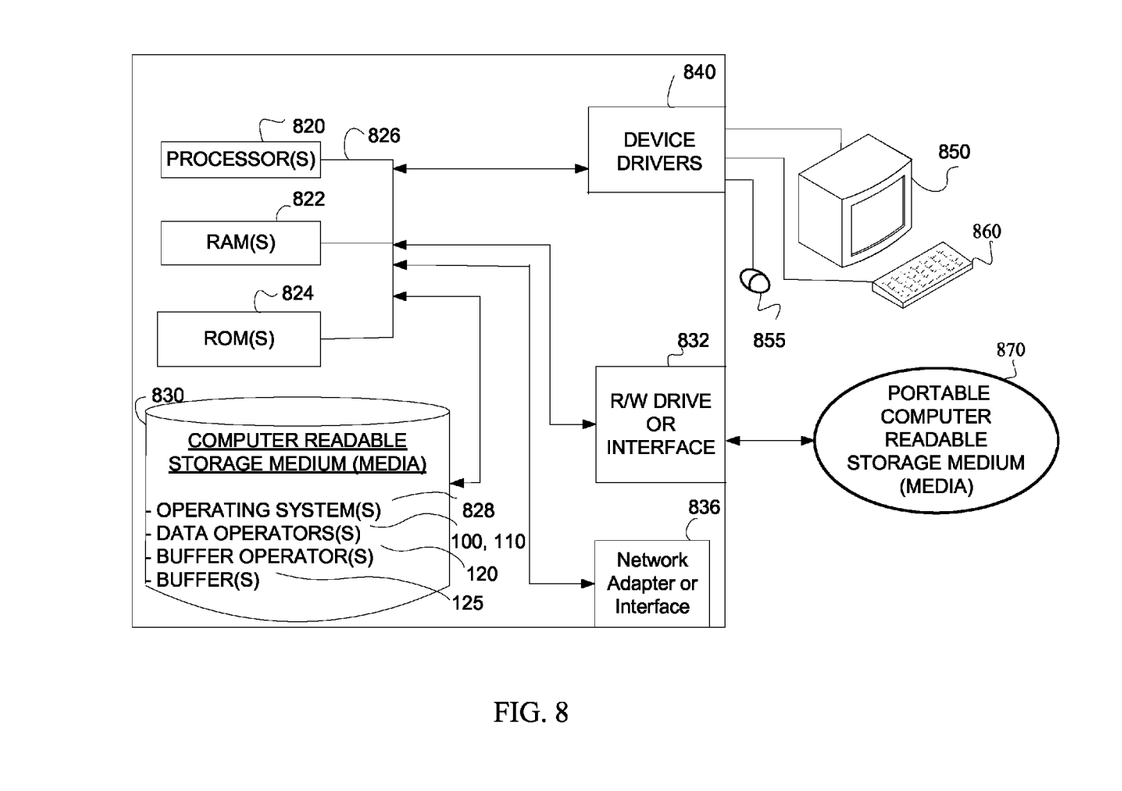
FIG. 8 depicts a block diagram of components of the computing device of a data warehouse environment, in accordance with an embodiment of the disclosure.

FIG. 1 illustrates a functional block diagram of an exemplary data warehouse environment 199, in accordance with an embodiment of the disclosure. Data warehouse environment 199 includes computing device 122 that includes one or more upstream data operators 100, one or more downstream data operators 110, one or more buffer operators 120, storage for one or more source data sets 105 that include data to be warehoused, storage for one or more warehouse data sets 115 to include the warehoused data, and storage for one or more buffers 125 to buffer data records from upstream data operator 100, all of which may be stored, for example, on a computer readable storage medium, such as computer readable storage medium (media) 830 (FIG. 8) or portable computer readable storage medium (media) 870 (FIG. 8). Computing device 122 may additionally include data communication links 150, 151, 152 which connect operators 100, 110, 120 and allow data to pass between them, such as link 150 connecting upstream data operator 100 with downstream data operator 110.

Computing device 122 represents a computing device, system or environment, and may be a laptop computer, a notebook computer, a personal computer (PC), a desktop computer, a tablet computer, a thin client, a mobile phone or any other electronic device or computing system capable of performing the required functionality of embodiments of the disclosure. Computing device 122 may include internal and external hardware components, as depicted and described in further detail with respect to FIG. 8. In other various embodiments of the present disclosure, computing device 122 may represent a computing system utilizing clustered computers and components to act as a single pool of seamless resources. In general, computing device 122 is representative of any programmable electronic device or combination of programmable electronic devices capable of executing machine-readable program instructions in accordance with an embodiment of the disclosure.

Generally, upstream data operator 100 and downstream data operator 110 represent a pair of operators in which upstream data operator 100 passes one or more data records to downstream data operator 110 when downstream data operator 110 signals, to upstream data operator 100, that it is ready to accept the data records. For purposes of illustration, upstream data operator 100 may, in an embodiment, execute as an ETL operator extracting source data records from source data set 105. In other embodiments, upstream data operator 100 may operate on data records already extracted from source data sets 105, such as performing a sort. Upstream data operator 100 may pass the extracted or operated upon data records to downstream data operator 110 for continued processing. The data records may be passed to downstream data operator 110 over data communication link 150. Upstream data operator 100 may pass data records to downstream data operator 110 when it receives a signal that the downstream data operator 110 is ready to accept data records.

In certain embodiments, downstream data operator 110 may execute as an ETL operator and operate on the data records passed from upstream data operator 100. In other embodiments, downstream data operator 110 may load the passed data records into the warehouse data set 115. Downstream data operator 110 may signal upstream data operator 100, over data communication link 150, when it has finished processing the passed data records and is ready to accept additional data records.

In various embodiments, when downstream data operator 110 is slow to signal for additional data records, buffer operator 120 may be inserted to buffer data records from upstream data operator 100. The interval of time before inserting a buffer operator 120 may be determined by a configurable timeout threshold parameter. In various embodiments, the timeout threshold parameter may be specified at design time. In certain other embodiments, the timeout threshold may be calculated during execution of the operator. The actual execution time of the operator may be compared to an expected execution time that allows the ETL process to complete within the contracted delivery time.

In various embodiments, when buffer operator 120 is inserted between upstream data operator 100 and downstream data operator 110, a data communication link 151 may be established between buffer operator 120 and upstream data operator 100, and a data communication link 152 may be established between buffer operator 120 and downstream data operator 110. The existing data communication link 150 may be removed, breaking the direct communication between upstream data operator 100 and downstream data operator 110. In certain embodiments, existing data communication link 150 may remain, but not used, until buffer operator 120 is removed. Buffer operator 120 may acquire system resources for buffers 125 to store data records passed from upstream data operator 100 until downstream data operator 110 is ready to accept additional data records. Buffers 125 may reside in system memory and/or on computer readable storage media. In various embodiments, once inserted, buffer operator 120 may function similarly to typical buffer operators included during ETL design or inserted with ETL tools.

In certain embodiments, buffer operator 120 may be removed when downstream data operator 110 response time improves and buffering is no longer needed. Various embodiments may include a configurable parameter to specify a minimum buffer utilization criteria, or minimum threshold value, for buffering to be removed. Certain embodiments may specify criteria as a minimum percentage of buffer 125 space utilized; other embodiments may specify criteria as a minimum number of buffered data records. Buffer operator 120 may throttle back incoming data when the buffer utilization decreases and the minimum criteria is reached. Throttling back incoming data may allow all the data records in buffers 125 to be passed to the downstream data operator 110 and the buffers 125 to drain, or empty. Removal of buffer operator 120 may include re-establishing direct communication between upstream data operator 100 and downstream data operator 110 over data communication link 150, releasing system resources acquired for buffers 125, and removing data communication links 151 and 152 with buffer operator 120. In various embodiments in which data communications link 150 may have remained, but was unused, re-establishing direct communication may include upstream data operator 100 reusing data communication link 150 to communicate directly with downstream data operator 110. Certain embodiments may re-establish direct communication between upstream data operator 100 and downstream data operator 110 over data communication link 150, effectively bypassing buffer operator 120, without actually removing buffer operator 120 or data communication links 151 and 152.

FIGS. 2A-2D are block diagrams of exemplary upstream data operator 100, exemplary downstream data operator 110, exemplary buffer operator 120, and exemplary data communication links 150, 151, 152, depicting progressive states of run time insertion and removal of exemplary buffer operator 120, in accordance with an embodiment of the disclosure.

Figure 2A:
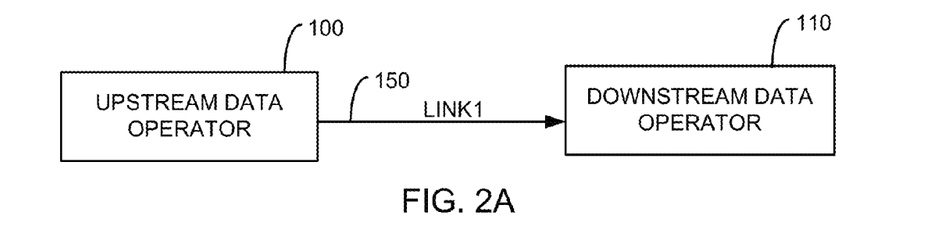
FIG. 2A is a block diagram depicting an exemplary upstream data operator communicating directly with an exemplary downstream data operator, in accordance with an embodiment of the disclosure.

FIG. 2A is a block diagram depicting an exemplary upstream data operator 100 communicating directly with an exemplary downstream data operator 110, in accordance with an embodiment of the disclosure. Upstream data operator 100 may communicate directly with downstream data operator 110 over data communication link 150. Downstream data operator 110 may operate on all data records passed from upstream data operator 100.

Figure 2B:
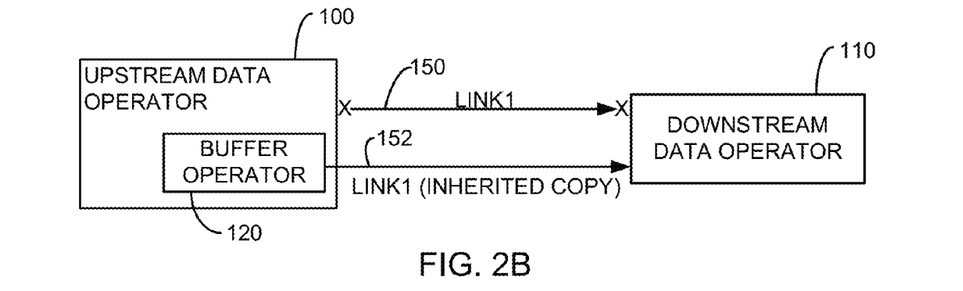
FIG. 2B is a block diagram depicting an exemplary slow downstream data operator, in accordance with an embodiment of the disclosure.

FIG. 2B is a block diagram depicting an exemplary slow downstream data operator 110, in accordance with an embodiment of the disclosure. Downstream data operator 110 may have stopped signaling its upstream data operator 100 that it is available for additional data records. A buffer operator 120 may be inserted to allow upstream data operator 100 to continue operating on subsequent data records. Inserted buffer operator 120 may inherit data communication link 150 from upstream data operator 100 and use it as its own data communication link 152 with downstream data operator 110. Inherited data communication link 152 allows buffer operator 120 to communicate directly with downstream data operator 110. In various embodiments, upstream data operator 100 may issue a fork ( ) system call to dynamically insert buffer operator 120. The direct data communication link 150 between upstream data operator 100 and downstream data operator 110 may be removed. In certain embodiments, the direct data communication link 150 may remain, but unused, until buffer operator 120 is removed.

Figure 2C:
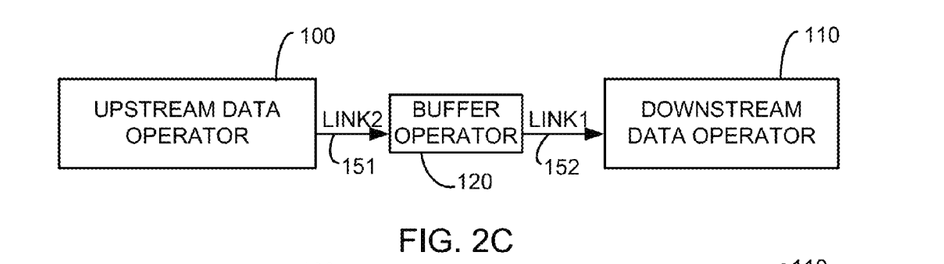
FIG. 2C is a block diagram depicting an inserted exemplary buffer operator, in accordance with an embodiment of the disclosure.

FIG. 2C is a block diagram depicting an inserted exemplary buffer operator 120, in accordance with an embodiment of the disclosure. Inserted buffer operator 120 may communicate with upstream data operator 100 over newly established data communication link 151. Buffer operator 120 now replaces downstream data operator 110 as the recipient of data records passed from upstream data operator 100 and replaces upstream data operator 100 as the supplier of data records passed to downstream data operator 110.

Figure 2D:
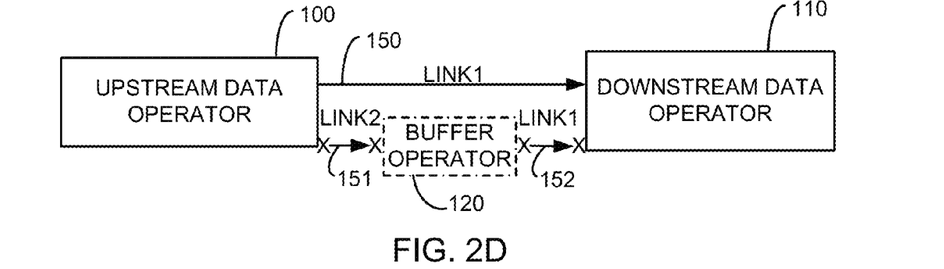
FIG. 2D is a block diagram depicting removal of an exemplary buffer operator, in accordance with an embodiment of the disclosure.

FIG. 2D is a block diagram depicting removal of exemplary buffer operator 120, in accordance with an embodiment of the disclosure. Buffer operator 120 may be removed when buffering is no longer required. Buffering may not be required, for example, when downstream data operator 110 performance improves. This may occur, for example, if network I/O traffic delaying downstream data operator 110 and network congestion cleared. In various embodiments, buffer operator 120 may recognize that buffering is no longer required and may remove its data communication links 151, 152 to upstream data operator 100 and downstream data operator 110, re-establish the original data communication link 150 between upstream data operator 100 and downstream data operator 110 and signal its execution has completed and is to be removed from the system. In various embodiments in which data communications link 150 may have remained, but was unused, re-establishing direct communication may include upstream data operator 100 reusing data communication link 150 to communicate directly with downstream data operator 110. Certain embodiments may re-establish direct communication between upstream data operator 100 and downstream data operator 110 over data communication link 150, effectively bypassing buffer operator 120, without actually removing buffer operator 120.

Figure 3:
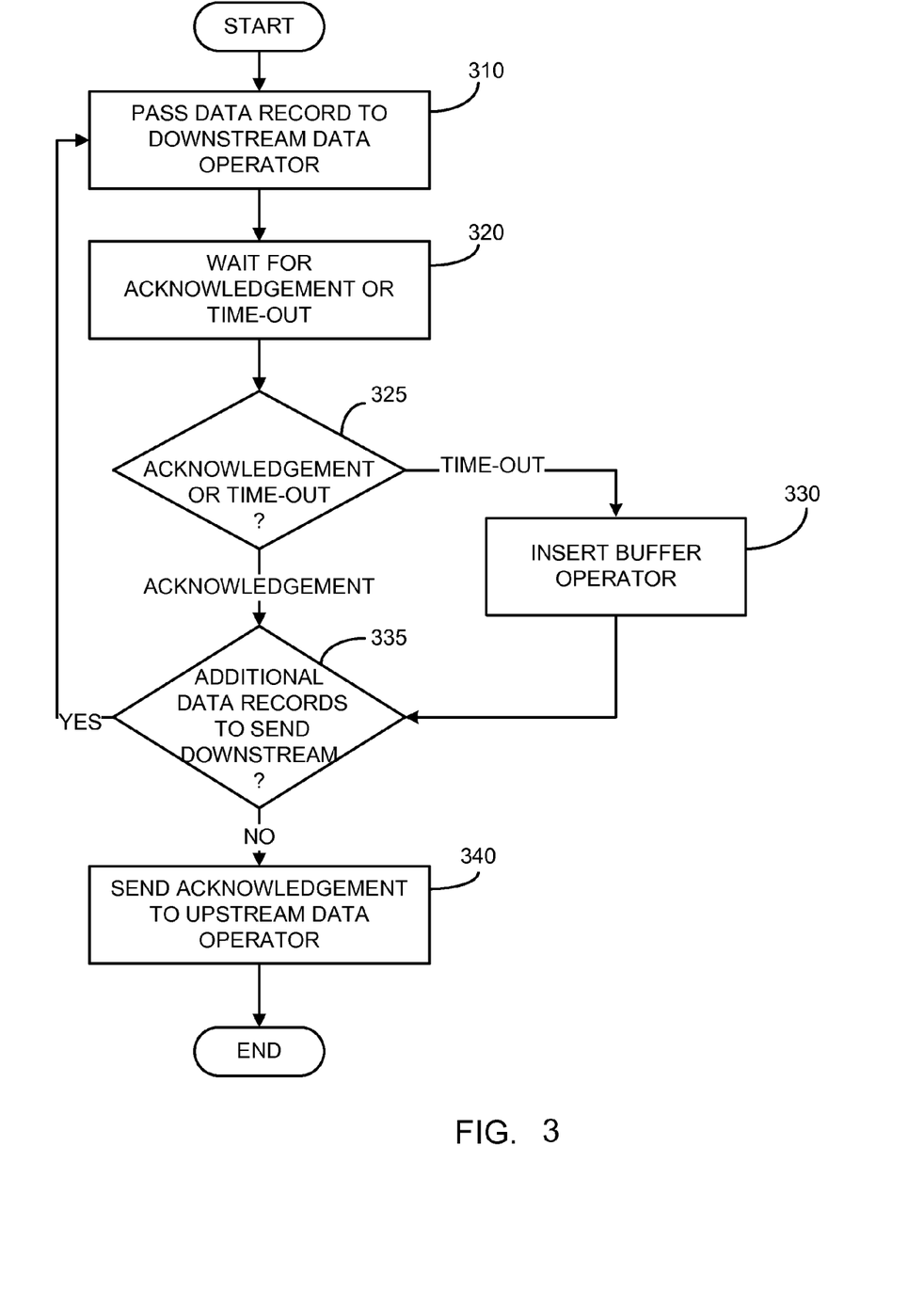
FIG. 3 is a flowchart illustrating the operation of an upstream data operator, in accordance with an embodiment of the disclosure.

FIG. 3 is a flowchart illustrating the operation of upstream data operator 100, in accordance with an embodiment of the disclosure. Upstream data operator 100 may have already extracted a source data record, or received a data record, operated upon that data record, and is ready to pass it to downstream data operator 110. In an embodiment, upstream data operator 100 may, at 310, pass the data record to downstream data operator 110 over data communication link 150. Upstream data operator 100 may, at 320, wait for a signal to continue processing. The signal may be either an acknowledgement that downstream data operator 110 is ready to accept additional data records or a time-out due to downstream data operator 110 taking too long to signal an acknowledgement. The time-out wait time, or threshold interval, may be a static, predetermined interval of time, an interval of time determined by a configurable parameter, or an interval of time dynamically determined based on targeted performance. If upstream data operator 100 determines, at 325, that the signal is a time-out, computing device 122 may insert, at 330, a buffer operator 120 to allow for continued passing of data records. In various embodiments, a fork ( ) system call may insert buffer operator 120.

If upstream data operator 100 determines, at 325, that the signal is an acknowledgement from downstream data operator 110 and there are additional data records to pass downstream, as determined at 335, upstream data operator 100 passes another data record to downstream data operator 110, at 310. If after an acknowledgement there are no additional data records to pass downstream, as determined at 335, upstream data operator 100 sends an acknowledgement upstream, at 340, to signal upstream data operator 100 is ready to accept additional data records.

Figure 4:
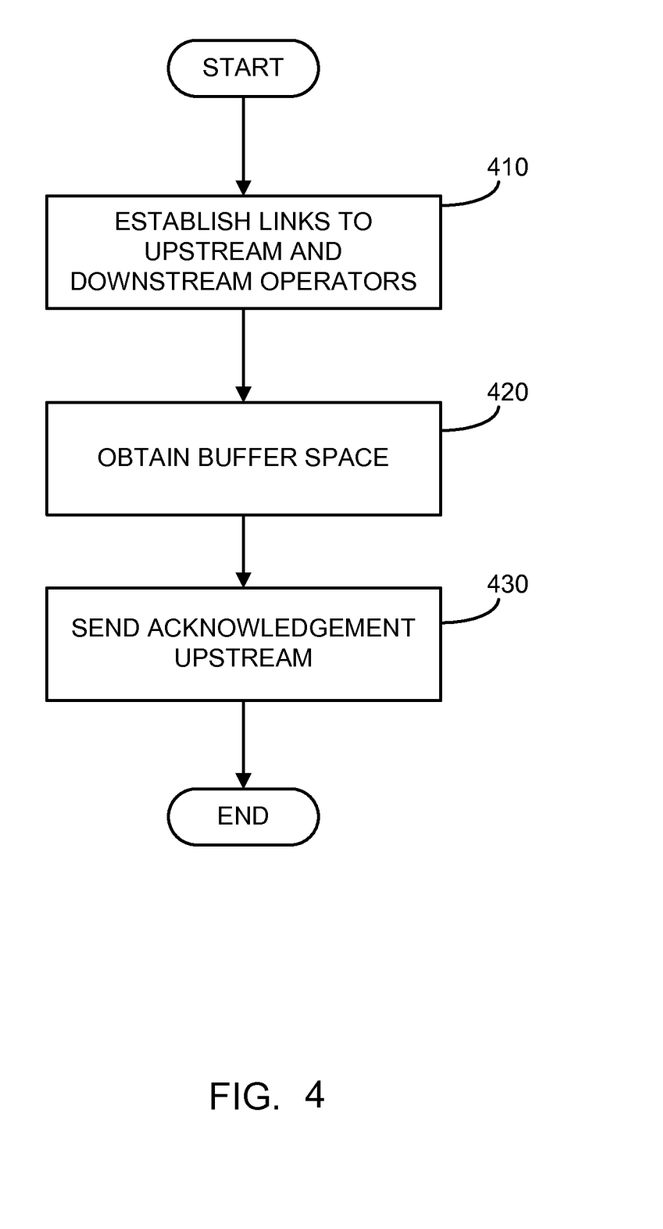
FIG. 4 is a flowchart illustrating a buffer operator insertion, in accordance with an embodiment of the disclosure.

FIG. 4 is a flowchart illustrating a buffer operator 120 insertion, in accordance with an embodiment of the disclosure. In an embodiment, inserting a buffer operator 120, during run time, may require computing device 122, at 410, to establish data communication links 151, 152 to upstream data operator 100 and downstream data operator 110, as described above with relation to FIGS. 2A-2D. This inserts buffer operator 120 between upstream data operator 100 and downstream data operator 110. Computing device 122 may additionally remove the direct data communication link 150 between upstream data operator 100 and downstream data operator 110. In certain embodiments, the direct data communication link 150 may remain, but unused, until buffer operator 120 is removed.

As in typical buffer operators, computing device 122 may, at 420, acquire system resources for buffers 125. At 430, computing device 122 may signal upstream data operator 100, with an acknowledgement, that the newly inserted buffer operator 120 is ready to accept a data record. Data records may now pass from upstream data operator 100 to buffer operator 120, acting as a downstream operator for upstream data operator 100. Buffer operator 120 also acts as an upstream operator to downstream data operator 110.

Figure 5:
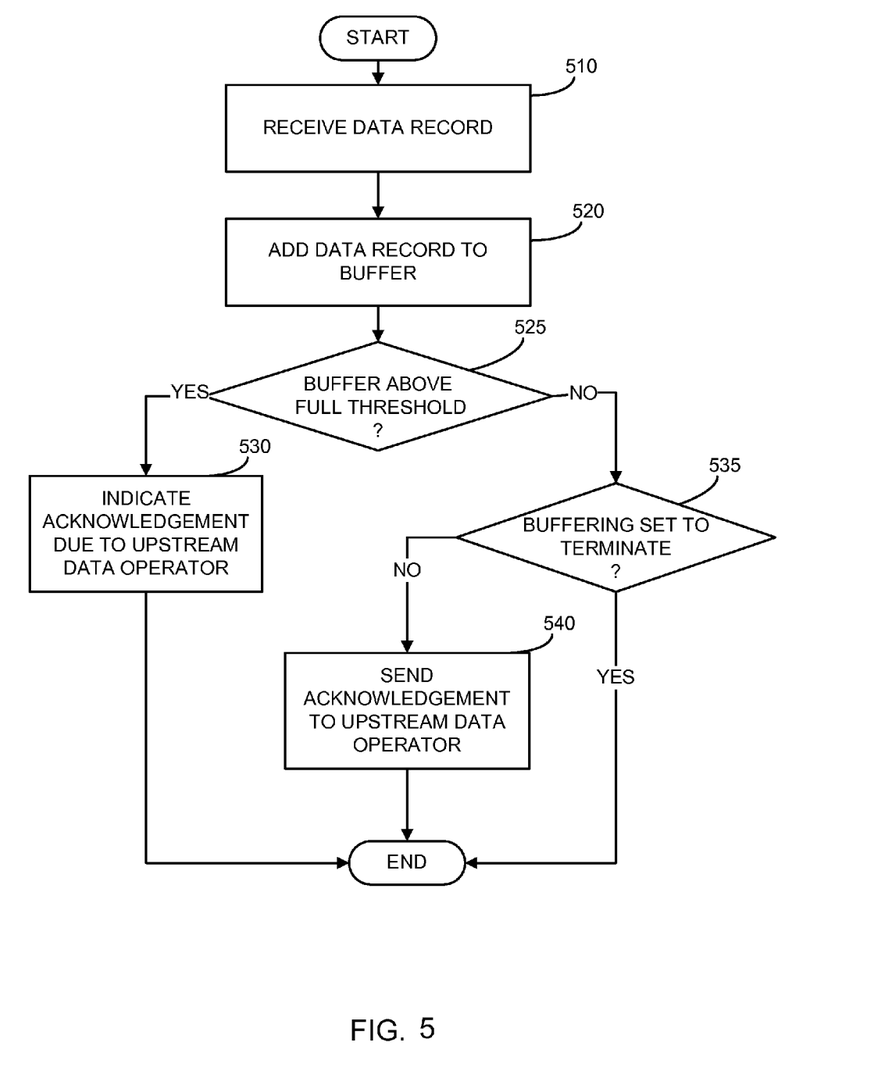
FIG. 5 is a flowchart illustrating the operation of a buffer operator receiving a data record, in accordance with an embodiment of the disclosure.

FIG. 5 is a flowchart illustrating the operation of buffer operator 120 receiving a data record, in accordance with an embodiment of the disclosure. After computing device 122 signals upstream data operator 100 that buffer operator 120 is ready to accept data records, buffer operator 120 may receive a data record, at 510, from upstream data operator 100. In various embodiments, buffer operator 120 may not perform any functions on the received data record; only add it to the buffer 125, at 520. Buffer operator 120 may determine the status of the buffers 125. A slow downstream data operator 110 may cause the buffers 125 to fill. A downstream data operator 110 that is processing quickly may cause the buffers 125 to empty and set an indicator that buffering may terminate. Buffer operator 120 may determine, at 525, that the buffer 125 is above the full threshold and throttle back upstream data operator 100 by not sending an acknowledgement. Throttling back upstream data operator 100 may prevent the I/O overhead of writing data records to external storage media. Buffer operator 120 may, at 530, set an indicator that upstream data operator 100 is due an acknowledgement after the buffers 125 fall below the buffer full threshold to restart upstream data operator 100 passing data records.

If the buffers are not above the full threshold, as determined at 525, buffer operator 120 determines, at 535, if buffering is set to terminate. If buffering is to terminate, as determined at 535, buffer operator 120 may throttle back upstream data operator 100 by not sending an acknowledgement. Throttling back upstream data operator 100, when buffering is set to terminate, may allow buffer operator 120 to empty the buffers 125 and allow computing device 122 to remove buffer operator 120.

After determining, at 535, that the buffering is not terminating, buffer operator 120 sends an acknowledgement, at 540, to upstream data operator 100 that it is ready to accept additional data records.

Figure 6:
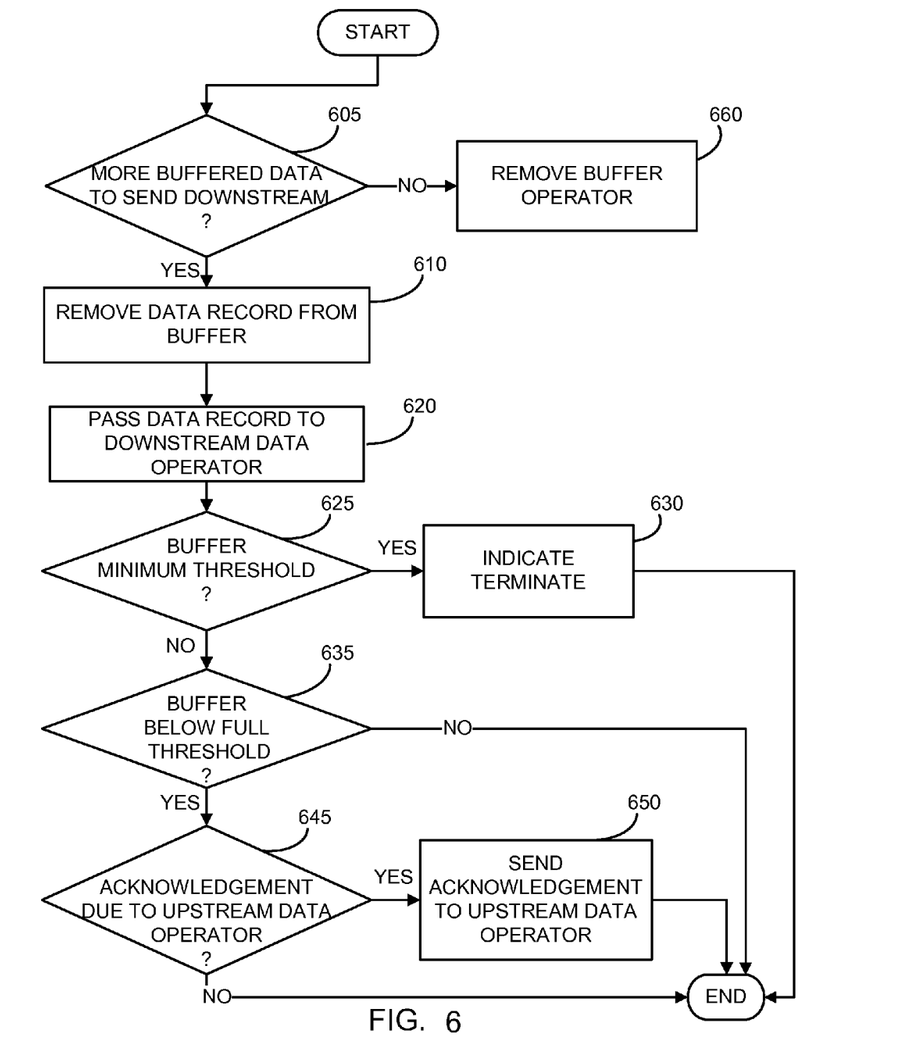
FIG. 6 is a flowchart illustrating the operation of a buffer operator receiving an acknowledgement, in accordance with an embodiment of the disclosure.

FIG. 6 is a flowchart illustrating the operation of buffer operator 120 receiving an acknowledgement signal, in accordance with an embodiment of the disclosure. Buffer operator 120 may receive an acknowledgement signal from downstream data operator 110 when downstream data operator 110 is ready to accept additional data records. Buffer operator 120 may pass data records from the buffers 125. After buffer operator 120 receives the acknowledgement, it determines, at 605, whether any data records remain in the buffers 125. Upon determining at 605 that more data records remain in the buffers 125, buffer operator 120 may remove a data record from the buffers 125, at 610 and pass the data record, at 620, to downstream data operator 110.

If removing a data record from the buffers 125 at 610, causes the buffers 125 to fall at or below the minimum criteria, as determined at 625, buffer operator 120 sets the terminate buffering indicator, at 630, to throttle back the upstream data operator 100 and allow the buffers 125 to empty, or drain. If removing a data record from the buffers 125 at 610, does not cause the buffers 125 to fall at or below the minimum criteria, as determined at 625, buffer operator 120 may determine, at 635, if the buffers 125 are below the full threshold. For buffers 125 at or above the full threshold, as determined at 635, buffer operator 120 may just continue to pass data records to downstream data operator 110 as downstream data operator 110 becomes available for more data records. Upstream data operator 100 may already be throttled down, allowing the number of data records in buffers 125 to shrink. For buffers 125 below the full threshold, as determined at 635, buffer operator 120 may determine if upstream data operator 100 should be un-throttled since the buffers 125 are no longer full. Buffer operator 120 may determine, at 645, whether an acknowledgement is due to upstream data operator 100. Buffer operator 120 may have set an acknowledgement due indicator and throttled down upstream data operator 100 when the buffers first reached or surpassed the full threshold. For an acknowledgement due to upstream data operator 100, as determined at 645, buffer operator 120 may send an acknowledgement, at 650, to upstream data operator 100 to indicate it is ready to accept additional data records. If no acknowledgement is due, as determined at 645, the buffers 125 have not reached the full threshold and upstream data operator 100 has not been throttled down.

After buffer operator 120 receives the acknowledgement from downstream data operator 110 and determines, at 605, that the buffers 125 are empty, computing device 122 removes buffer operator 120, at 660.

Figure 7:
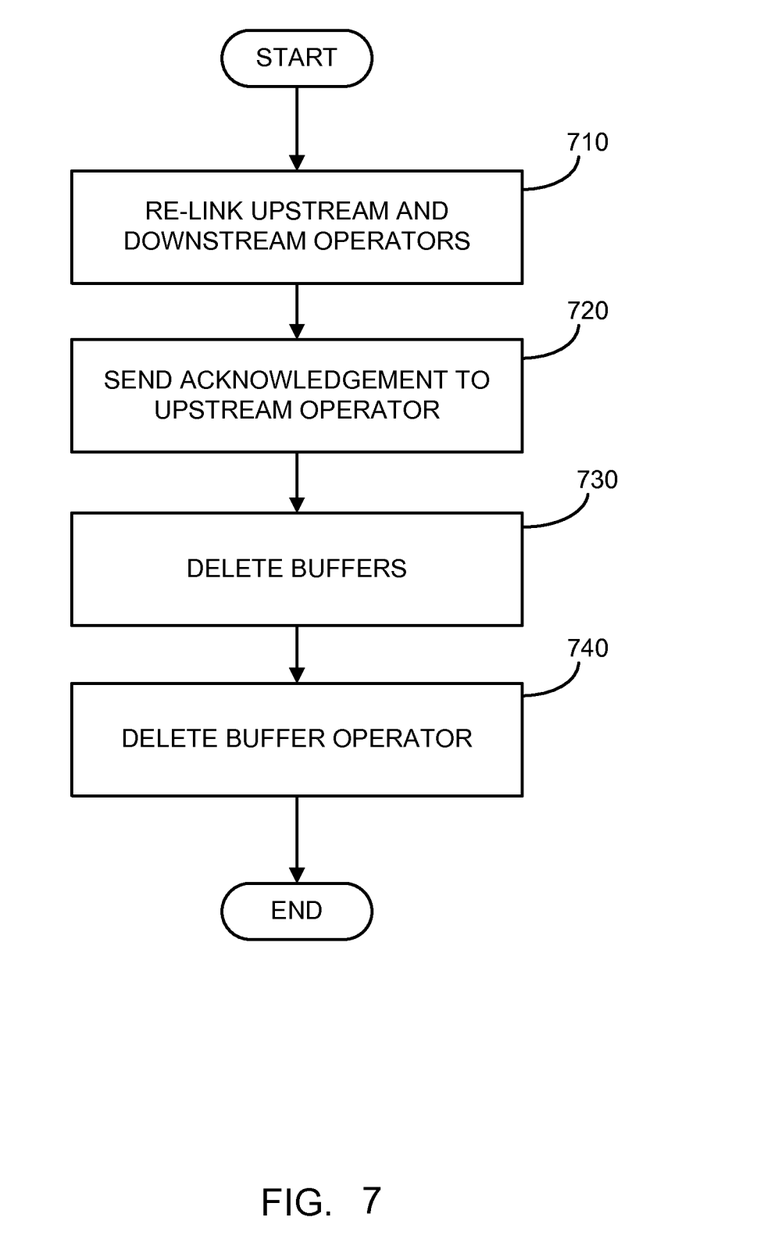
FIG. 7 is a flowchart illustrating a buffer operator removal, in accordance with an embodiment of the disclosure.

FIG. 7 is a flowchart illustrating buffer operator 120 removal, in accordance with an embodiment of the disclosure. In an embodiment, removing a buffer operator 120, during run time, may require computing system 122, at 710, to re-establish a direct data communication link 150 between upstream data operator 100 and downstream data operator 110. In certain embodiments in which data communications link 150 may have remained, but was unused, re-establishing direct communication may include upstream data operator 100 reusing data communication link 150 to communicate directly with downstream data operator 110. At 720, computing device 122 may send a final acknowledgement to upstream data operator 100 as a signal that the downstream data operator 110 is ready to accept additional data records. The buffers are now empty and buffer operator 120 is no longer the downstream operator of upstream data operator 100. New data records will be passed directly from upstream data operator 100 to downstream data operator 110. Computing device 122 may, at 730, release the acquired system resources used for buffers 125, and at 740, delete the buffer operator 120.

FIG. 8 depicts a block diagram of components of a computing device 122 of the data warehouse environment 199 of FIG. 1, in accordance with an embodiment of the disclosure. It should be appreciated that FIG. 8 provides only an illustration of one implementation and does not imply any limitations with regard to the environments in which different embodiments may be implemented. Many modifications to the depicted environment may be made.

Computing device 122 can include one or more processors 820, one or more computer-readable RAMs 822, one or more computer-readable ROMs 824, one or more computer readable storage medium 830, device drivers 840, read/write drive or interface 832, and network adapter or interface 836, all interconnected over a communications fabric 826. Communications fabric 826 can be implemented with any architecture designed for passing data and/or control information between processors (such as microprocessors, communications and network processors, etc.), system memory, peripheral devices, and any other hardware components within a system.

One or more operating systems 828, upstream data operators 100, downstream data operators 110, buffer operators 120, and buffers 125 are stored on one or more of the computer-readable storage medium 830 for execution by one or more of the processors 820 via one or more of the respective RAMs 822 (which typically include cache memory). In the illustrated embodiment, each of the computer readable storage medium 830 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer readable storage medium that can store a computer program and digital information.

Computing device 122 can also include a R/W drive or interface 832 to read from and write to one or more portable computer readable storage medium 870. Upstream data operator 100, downstream data operator 110, buffer operator 120, and buffers 125 on computing device 122 can be stored on one or more of the portable computer readable storage medium 870, read via the respective R/W drive or interface 832, and loaded into the respective computer readable storage medium 830.

Computing device 122 can also include a network adapter or interface 836, such as a TCP/IP adapter card or wireless communication adapter (such as a 4G wireless communication adapter using OFDMA technology). Upstream data operator 100, downstream data operator 110, and buffer operator 120 on computing device 122 can be downloaded to the computing device from an external computer or external storage device via a network (for example, the Internet, a local area network or other, wide area network or wireless network) and network adapter or interface 836. From the network adapter or interface 836, the programs are loaded into the computer readable storage medium 830. The network may comprise copper wires, optical fibers, wireless transmission, routers, firewalls, switches, gateway computers, and/or edge servers.

Computing device 122 can also include a display screen 850, a keyboard or keypad 860, and a computer mouse or touchpad 855. Device drivers 840 interface to display screen 850 for imaging, to keyboard or keypad 860, to computer mouse or touchpad 855, and/or to display screen 850 for pressure sensing of alphanumeric character entry and user selections. The device drivers 840, R/W drive or interface 832, and network adapter or interface 836 can comprise hardware and software (stored in computer readable storage medium 830 and/or ROM 824).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A method for insertion, in a data warehouse process, of a buffer operator between an upstream data operator and a downstream data operator, the method comprising:
processing, by a processor, a data record for the upstream data operator to pass to the downstream data operator via a direct data communication link;
determining whether the downstream data operator is ready to accept the data record based on a response signal by the downstream data operator, wherein the response signal includes an acknowledgment that the downstream data operator is ready to accept the data record;
in response to determining, by the processor, that the downstream data operator is not ready to accept the data record from the upstream data operator based on the downstream data operator failing to provide the response signal within a specified time interval, inserting, by the processor, a buffer operator between the upstream data operator and the downstream data operator, wherein the buffer operator is inserted using at least one additional data communication link apart from the direct data communication link between the upstream data operator and the downstream data operator, and wherein the direct data communication link is unused until the buffer operator is removed;

passing, by the processor, the data record processed by the upstream data operator to the buffer operator for storing into a buffer allocated for use by the buffer operator;

passing, by the processor, the data record stored into the buffer to the downstream data operator when the downstream data operator is ready to accept data; and in response to determining, by the processor, that a buffer utilization of the buffer allocated to the buffer operator decreases to a threshold value:

draining the buffer;

removing, by the processor, the buffer operator and releasing the buffer, wherein removal of the buffer operator include re-establishment of direct communication between upstream data operator and downstream data operator over the direct data communication link; and passing, by the processor, data records processed by the upstream data operator directly to the downstream data operator.

2. The method according to claim 1, wherein the buffer operator is inserted using the direct data communication link between the upstream data operator and the downstream data operator, and wherein re-establishing direct communication between the upstream data operator and the downstream data operator includes bypassing the buffer operator without removing the buffer operator.

3. The method according to claim 1, wherein the buffer utilization threshold value is a configurable value.

4. The method according to claim 3, wherein the buffer utilization threshold value is a percentage of the allocated buffer.

5. The method according to claim 3, wherein the buffer utilization threshold value is a number of data records in the buffer.

6. A computer program product for insertion, in a data warehouse process, of a buffer operator between an upstream data operator and a downstream data operator, the computer program product comprising one or more computer readable storage medium and program instructions stored on at least one of the one or more computer readable storage medium, the program instructions comprising:

program instructions to process, by a processor, a data record for the upstream data operator to pass to the downstream data operator via a direct data communication link;

program instructions to determine whether the downstream data operator is ready to accept the data record based on a response signal by the downstream data operator, wherein the response signal includes an acknowledgment that the downstream data operator is ready to accept the data record;

in response to program instructions to determine, by the processor, that the downstream data operator is not ready to accept the data record from the upstream data operator based on the downstream data operator failing to provide the response signal within a specified time interval, program instructions to insert, by the processor, a buffer operator between the upstream data operator and the downstream data operator, wherein the buffer operator is inserted using at least one additional data communication link apart from the direct data communication link between the upstream data operator and the downstream data operator, and wherein the direct data communication link is unused until the buffer operator is removed;

program instructions to pass, by the processor, the data record processed by the upstream data operator to the buffer operator for storing into a buffer allocated for use by the buffer operator;

program instructions to pass, by the processor, the data record stored into the buffer to the downstream data operator when the downstream data operator is ready to accept data; and in response to determining that a buffer utilization of the buffer allocated to the buffer operator decreases to a threshold value:

program instructions to drain the buffer;

program instructions to remove the buffer operator and releasing the buffer, wherein removal of the buffer operator include re-establishment of direct communication between upstream data operator and downstream data operator over the direct data communication link; and program instructions to pass data records processed by the upstream data operator directly to the downstream data operator.

7. The computer program product according to claim 6, wherein the buffer operator is inserted using the direct data communication link between the upstream data operator and the downstream data operator, and wherein re-establishing direct communication between the upstream data operator and the downstream data operator includes bypassing the buffer operator without removing the buffer operator.

8. The computer program product according to claim 6, wherein the buffer utilization threshold value is a configurable value.

9. The computer program product according to claim 8, wherein the buffer utilization threshold value is a percentage of the allocated buffer.

10. The computer program product according to claim 8, wherein the buffer utilization threshold value is a number of data records in the buffer.

11. A computer system for insertion, in a data warehouse process, of a buffer operator between an upstream data operator and a downstream data operator, the computer system comprising one or more processors, one or more computer readable memories, one or more computer readable storage medium, and program instructions stored on at least one of the one or more storage medium for execution by at least one of the one or more processors via at least one of the one or more memories, the program instructions comprising:

program instructions to process, by a processor, a data record for the upstream data operator to pass to the downstream data operator via a direct data communication link;

program instructions to determine whether the downstream data operator is ready to accept the data record based on a response signal by the downstream data operator, wherein the response signal includes an acknowledgment that the downstream data operator is ready to accept the data record;

in response to program instructions to determine, by the processor, that the downstream data operator is not ready to accept the data record from the upstream data operator based on the downstream data operator failing to provide the response signal within a specified time interval, program instructions to insert, by the processor, a buffer operator between the upstream data operator and the downstream data operator, wherein the buffer operator is inserted using at least one additional data communication link apart from the direct data communication link between the upstream data operator and the downstream data operator, and wherein the direct data communication link is unused until the buffer operator is removed;

program instructions to pass, by the processor, the data record processed by the upstream data operator to the buffer operator for storing into a buffer allocated for use by the buffer operator;

program instructions to pass, by the processor, the data record stored into the buffer to the downstream data operator when the downstream data operator is ready to accept data; and in response to determining that a buffer utilization of the buffer allocated to the buffer operator decreases to a threshold value:
  program instructions to drain the buffer;
  program instructions to remove the buffer operator and releasing the buffer, wherein removal of the buffer operator include re-establishment of direct communication between upstream data operator and downstream data operator over the direct data communication link; and
  program instructions to pass data records processed by the upstream data operator directly to the downstream data operator.

12. The computer system according to claim 11, wherein the buffer operator is inserted using the direct data communication link between the upstream data operator and the downstream data operator, and wherein re-establishing direct communication between the upstream data operator and the downstream data operator includes bypassing the buffer operator without removing the buffer operator.

13. The computer system according to claim 11, wherein the buffer utilization threshold value is a configurable value.

14. The computer system according to claim 13, wherein the buffer utilization threshold value is a percentage of the allocated buffer.

* * * * *